Aug. 3, 1954  F. A. SCHULTZ  2,685,107
METHOD OF MOLDING PLASTIC ARTICLES
Filed April 9, 1951

INVENTOR
F. A. SCHULTZ
BY *E. F. Kane*
ATTORNEY

Patented Aug. 3, 1954

2,685,107

UNITED STATES PATENT OFFICE 2,685,107

METHOD OF MOLDING PLASTIC ARTICLES

Frank A. Schultz, La Grange, Ill., assignor to Western Electric Company, Incorporated, New York, N. Y., a corporation of New York Application April 9, 1951, Serial No. 219,943

8 Claims. (Cl. 18—59)

This invention relates to methods of molding plastic articles, and more particularly to methods of molding plastic articles having inserts therein.

In the manufacture of molded articles, such as cable terminals and terminal blocks, for example, wherein a plurality of inserts are embedded in molding material, it is the usual practice to place the inserts in metal molds, insert the molding material into the molds around the inserts, set the molding material and then strip the molded article from the metallic mold. However, many molds are required and it has been difficult to strip the articles from the molds without damage thereto.

An object of the invention is to apply new and improved methods of molding plastic articles.

A further object of the invention is to provide new and improved methods of molding thermosetting articles.

Another object of the invention is to provide methods of molding plastic articles having inserts therein, wherein the inserts are mounted in a shell of plastic material and molding composition is poured into the shell around the inserts and is set to form a composite article with the inserts of the shell.

A method illustrating certain features of the invention may include forming plastic material into a shell, mounting inserts in predetermined positions in the shell, filling the shell with a plastic compound and setting the plastic compound in the shell.

Figure 1:
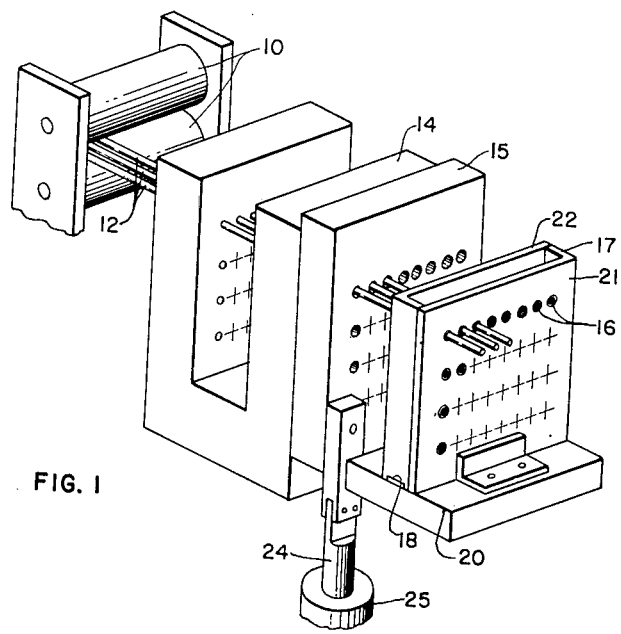
Figure 2:
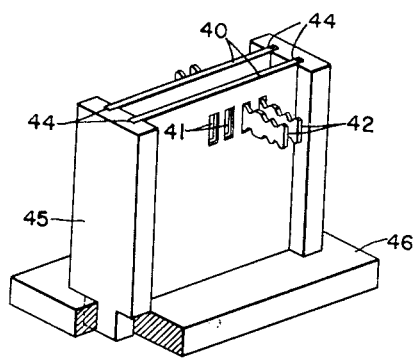

A complete understanding of the invention may be obtained from the following detailed description of methods forming specific embodiments thereof, when read in conjunction with the accompanying drawing, in which:

Fig. 1 is a perspective view of an apparatus for practicing a method forming one embodiment of the invention, and Fig. 2 is a perspective view of another apparatus for practicing a method forming a second embodiment of invention.

Referring now in detail to the drawing, there is shown in Fig. 1, a plurality of feed rollers 10—10 for advancing the wires 12—12 through shear blocks 14 and 15 and through aligned, tapered apertures 16—16 formed in opposite walls of a shell 17 mounted on a pair of lugs, of which a lug 18 is shown, of a supporting plate 20. The shell 17 is composed of identical L-shaped sheets 21 and 22 of a high melting point thermoplastic insulating material, such as polystyrene, for example, which are cemented together to form an integral shell. After the wires 12—12 have been positioned in the apertures 16—16, the shear plate 15 and the plate 20 are moved relative to the shear plate 14 by a piston 24 and cylinder 25 to shear the wires. An organic casting compound, such as, for example, a resin including polystyrene as the essential ingredient thereof or a thermoplastic compound, is poured into the shell 17 and is set without pressure by application of heat in the case of a thermosetting compound at a sufficiently low temperature that the shell 17 is not materially softened during the application of the heat, or by mere cooling in the case of a thermoplastic compound. The composite article thus formed then is broken loose from the lugs 18—18 and the short lengths of wires are firmly embedded in the hardened resin.

In a method forming an alternative embodiment of the invention, sheets 40—40 having aligned, tapered slots 41—41 therein for receiving metallic terminals 42—42 are slid into slots 44—44 formed in removable end pieces 45—45 projecting upwardly from a base plate 46. The terminals 42—42 are then positioned through the aligned slots 41—41 in the sheets 40—40 which are composed of suitable plastic material, such as a polystyrene resin, or the like, having a high melting point. Molding material, such as a thermosetting polystyrene resin or a thermoplastic material, in a plastic state is poured into the cavity formed between the sheets 40—40, the end pieces 45—45 and the base 46. The material is then set by cooling or by the application of heat, depending on whether a thermoplastic material or a thermosetting material is used. The end pieces 45—45 then are detached from the base 46 which is also detached from the molding material, and the sheets 40—40, and the end pieces 45—45 then are separated from the molded article.

Where a material solidifiable by heat is used to fill the spaces between the sheets 21 and 22 and 40—40, these sheets should be of a material having a sufficiently high melting point that they do not materially soften during the application of heat to the filling material, and the temperature of the filling material during the solidifying operation should be kept sufficiently low to prevent material softening of the sheets. The sheets bond to the filling material, and form smooth sides in finished terminal strips.

The methods described hereinabove serve to form composite molded articles without the necessity of metallic molds without the difficult stripping steps necessary where molds are used.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A method of making a terminal strip, which comprises forming an open-ended box-like structure of a molded plastic base material, inserting metallic terminal members through two opposed sides of the box-like structure, and then filling the interior of the box-like structure with a casting resin.

2. The method of making terminal strips, which comprises forming plastic material into a shell, mounting inserts in predetermined positions in the shell, filling the shell with a plastic compound in a plastic condition, and setting the plastic compound in the shell.

3. The method of making terminal strips, which comprises inserting terminals through spaced apertures formed in opposed sheets of insulating material, filling the space between the sheets with a plastic insulating compound in a plastic condition, maintaining the compound between the sheets, and solidifying the plastic insulating compound and bonding it to the sheets and the portions of the terminals extending between the sheets.

4. The method of making terminal strips, which comprises inserting terminals through spaced apertures formed in opposed sheets of plastic insulating material having a predetermined melting point, filling the space between the sheets with a plastic insulating compound settable by heat without pressure, holding the compound in the space between the sheets, and heating the compound to a temperature sufficient to set it and below that at which the sheets of plastic insulating material soften materially.

5. The method of making terminal strips, which comprises holding together a pair of perforated sheets of insulating material so formed as to form a box, inserting metallic terminals through perforations in opposed sides of the sheet, filling the box with plastic insulating material, and solidifying the plastic insulating material.

6. The method of making terminal strips, which comprises holding a pair of perforated sheets of insulating material in positions extending between the arms of a U-shaped fixture, placing terminals in the perforations in the sheets, filling the space between the sheets with a plastic insulating compound, solidifying the plastic compound to bond it to the sheets and the terminals to form a terminal strip, and stripping the terminal strip from the fixture.

7. The method of making terminal strips, which comprises holding together a pair of L-shaped sheets of insulating material having apertures therein to form a shell having a closed periphery inserting terminals through opposed apertures in the sheets, filling the shell with a plastic insulating compound in a plastic condition, and solidifying the insulating compound to secure it to the sheets and the terminals.

8. The method of making terminal strips, which comprises mounting a pair of sheets of insulating material having apertures therein in opposing positions in which the apertures are aligned, closing the spaces between the edges of the sheets, running wires through the aligned apertures, severing the wires, filling the space between the sheets with plastic insulating material in a plastic condition, and solidifying the plastic insulating material.

References Cited in the file of this patent

UNITED STATES PATENTS

| Number | Name | Date |
| --- | --- | --- |
| 1,161,193 | Cook | Nov. 23, 1915 |
| 1,650,706 | Gent | Nov. 29, 1927 |
| 1,960,120 | Mohring | May 22, 1934 |
| 2,303,416 | Woods | Dec. 1, 1942 |